US012783229B2

(12) United States Patent
Beveridge

(10) Patent No.: US 12,783,229 B2
(45) Date of Patent: Nov. 3, 2026

(54) LIFECYCLE MANAGEMENT OF IN-VEHICLE HOSTED MACHINES

(71) Applicant: VMware LLC, Palo Alto, CA (US)

(72) Inventor: Daniel J. Beveridge, Valrico, FL (US)

(73) Assignee: VMware LLC, Palo Alto, CA (US)

( * ) Notice: Subject to any disclaimer, the term of this patent is extended or adjusted under 35 U.S.C. 154(b) by 281 days.

(21) Appl. No.: 18/765,918

(22) Filed: Jul. 8, 2024

(65) Prior Publication Data

US 2025/0036394 A1 Jan. 30, 2025

Related U.S. Application Data

(60) Provisional application No. 63/529,139, filed on Jul. 26, 2023.

(51) Int. Cl.

| | |
|---|---|
| ***G06F 9/44*** | (2018.01) |
| ***G06F 8/656*** | (2018.01) |
| ***G06F 9/455*** | (2018.01) |

(52) U.S. Cl.

CPC .......... *G06F 8/656* (2018.02); *G06F 9/45558* (2013.01); *G06F 2009/45595* (2013.01)

(58) Field of Classification Search

CPC ................. G06F 8/656; G06F 9/45558; G06F 2009/45595

See application file for complete search history.

(56) References Cited

U.S. PATENT DOCUMENTS

| | | | | |
|---|---|---|---|---|
| 11,775,278 | B1 * | 10/2023 | Deshmukh | G06F 8/65 717/173 |
| 2015/0178109 | A1 | 6/2015 | Li et al. | |
| 2015/0370611 | A1 * | 12/2015 | Amann | G06F 9/5088 709/216 |
| 2018/0293067 | A1 | 10/2018 | Hirshberg | |
| 2019/0146780 | A1 | 5/2019 | Barrat et al. | |
| 2023/0025735 | A1 * | 1/2023 | Acharya | G06F 8/65 |

OTHER PUBLICATIONS

Ayres, N. et al., Continuous Automotive Software Updates Through Container Image Layers, Electronics, 2021, 10:739, 17 pages.

European Patent Office, Extended Search Report, Application No. 24190779.9, Feb. 20, 2025, 9 pages.

* cited by examiner

*Primary Examiner* — Qamrun Nahar

(74) *Attorney, Agent, or Firm* — Quarles & Brady LLP

(57) ABSTRACT

Some embodiments provide a novel method for efficiently updating software of virtual machines (VMs) executing on devices in a vehicle such that updates to the software do not interrupt operations performed by the VMs. While the vehicle operates, the method collects configuration state information of a first VM executing on a device and performing a set of operations. The method uses the configuration state information to instantiate a second VM in an isolated network environment that is isolated from the first VM. The second VM is identical to the first VM at a particular time the configuration state information was collected. The method updates the second VM, and detects a compute downtime of the vehicle. During the compute downtime, the method uses the updated second VM on the device instead of the first VM such that the updated second VM performs the set of operations once the compute downtime ends.

15 Claims, 8 Drawing Sheets

LIFECYCLE MANAGEMENT OF IN-VEHICLE HOSTED MACHINES

CROSS REFERENCE TO RELATED APPLICATIONS

This application claims the benefit of U.S. Provisional Application No. 63/529,139 filed on Jul. 26, 2023 and titled, "LIFECYCLE MANAGEMENT OF IN-VEHICLE HOSTED MACHINES," the entire teachings of which is hereby incorporated by reference in its entirety for all purposes.

BACKGROUND

As vehicles modernize and implement advanced computing application platforms (such as ESXi provided by VMware Inc.) into embedded in-car computing hardware systems, applications in some embodiments increase due to the consolidation opportunity an in-vehicle hypervisor offers. However, with new virtual machines (VMs) becoming part of critical functions of commercial vehicles (such as of first-responder vehicles), the need to update, secure, and manage VMs critical for use by vehicles and their occupants arises. For example, police vehicles with such onboard systems in some embodiments execute multiple virtual machines, which perform various functions, such as (1) license and registration verification, (2) video streaming of in-vehicle cameras and body worn cameras, (3) forensic data gathering (such as collection of crime victim phone images and associated analysis), (4) logging and security functions for the vehicle itself (along with logistical information communicated to in-vehicle operators about their immediate mission), and (5) data synchronization to a cloud from in-vehicle sources. Many additional functions performed by the vehicle's VMs may emerge over time. In a typical datacenter, some embodiments schedule updating and other general intensive functions (such as anti-virus scanning activity) at any time convenient to the vehicle or datacenter operator. However, in such embodiments, there is minimal consideration for interruption of the services provided by the vehicle's VMs. For in-vehicle systems, interruptions of service of VMs take on greater significance and must be managed more carefully. Hence, methods and system are needed for updating VMs executing in a vehicle that minimizes downtime of the VMs.

BRIEF SUMMARY

Some embodiments provide a novel method for efficiently updating software of virtual machines (VMs) executing on one or more devices in a vehicle such that updates to the software do not interrupt operations performed by the VMs. While the vehicle operates, the method collects configuration state information of a first VM executing on a particular device and performing a particular set of operations. The method uses the configuration state information to instantiate a second VM in an isolated network environment that is isolated from the first VM. The second VM is identical to the first VM at a particular time the configuration state information was collected. The method updates the second VM. The method detects a compute downtime of the vehicle. During the compute downtime, the method uses the updated second VM on the device instead of the first VM such that the updated second VM performs the set of operations once the compute downtime ends.

In some embodiments, the method is performed by a management agent (MA) executing on the particular device. The MA is an application, program, or module executing on the particular device. In some embodiments, the isolated environment is an isolated network such that the second VM does not interfere with the particular set of operations performed by the first VM when the second VM is instantiated in the isolated network. The isolated environment is referred to as an isolated network, a sandbox, and a staging area in different embodiments, and allows for the creation and update of the second VM without interrupting the first VM and the operations it performs. In some embodiments, the particular device is a computer.

The isolated network environment is in some embodiments an isolated network associated with a private virtual local area network (VLAN) such that the second VM does not interfere with the particular set of operations performed by the first VM when the second VM is instantiated in the isolated network and before the compute downtime of the vehicle. In such embodiments, the isolated network is a private network segment within a virtual switch of the particular device's hypervisor using the private VLAN. The private VLAN is in some embodiments associated with a unique port group to ensure that traffic sent to and from the second VM does not collide with traffic sent to and from the first VM in a different VLAN, as they have the same Internet Protocol (IP) address.

The MA of the particular device performs the collecting, using, updating, and detecting after receiving direction to update the first VM from a management plane (MP) implemented by a set of one or more management servers that connect to the vehicle through a software-defined wide area network (SD-WAN). In such embodiments, the MP directs the MA to update the first VM, and the MA performs the collecting, using, updating, and detecting in order to update the first VM.

In some embodiments, the set of managers implementing the MP operates at a different location than the vehicle. For instance, the vehicle in some embodiments moves around different locations, while the set of management servers execute at an edge site of the SD-WAN. Alternatively, the set of management servers execute at a datacenter site of the SD-WAN. Still, in other embodiments, the set of management servers execute in a distributed fashion at two or more sites of the SD-WAN.

The vehicle in some embodiments includes an edge router that connects to the SD-WAN using a set of one or more wireless network connection links. The edge router of some embodiments is one of an edge router appliance, an edge router executing on a computer that operates in the vehicle, or an edge router executing on a machine that executes on the computer. The wireless network connection links are in some embodiments provided by one or more different telecommunication link providers (e.g., different cellular providers).

In some embodiments, the MA updates the second VM by directing the hypervisor of the particular device to direct an update agent associated with the second VM to download a set of one or more update files associated with a particular update for the first VM and update the second VM. In such embodiments, each VM instantiated on the particular device and each copy of each VM executes an update agent that performs software updates for its respective VM. The update agent in some embodiments downloads the set of update files from the MP using one or more of the set of wireless network connection links. In other embodiments, update agent in some embodiments downloads the set of update files from a set of one or more other locations specified by the MP (e.g., external repositories) using the set of wireless network connection links.

The configuration state information in some embodiments includes an operating system (OS) disk of the first VM that specifies one or more OS files and application software related to the first VM at the particular time the configuration state information was collected. In such embodiments, the OS disk is copied at the particular time in order to freeze the state of the first VM and to create the second VM using the OS disk. The second VM is referred to in some embodiments as a duplicate of the first VM's configuration file. The first VM's configuration file and the copy of the first VM's configuration file are in some embodiments referred to as VMX files. In some embodiments, after copying the OS disk, the first VM write subsequent OS disk operations to a journal.

The MA collects the configuration state information in some embodiments by directing the hypervisor of the particular device to collect the OS disk at the particular time. In such embodiments, the MA receives notification from the MP to update the first VM, which causes the MA to direct the hypervisor to copy the first VM's OS disk. Then, the MA uses the configuration state information to instantiate the second VM by directing the hypervisor to use the OS disk to instantiate the second VM. In such embodiments, the OS disk is copied to create the second VM, but independent data disks are not copied. Data disks in some embodiments specify application data and do not specify software. Independent data disks in some embodiments are data disks that are labeled as independent, meaning that it will not be copied by the hypervisor.

Rather, when the second VM is to be used instead the first VM, the hypervisor will instead transfer the first VM's independent data disks to the second VM. This is referred to in some embodiments as a zero-copy transfer, which enables the MA to update the first VM faster than if it were to direct the hypervisor to also copy the data disks of the first VM. Performing a zero-copy transfer of data disks from the first VM to the second VM is very rapid since none of this data is copied within the hypervisor system and since no heavy storage operations are required to detach and reattach data disks from the first VM to the second VM.

In some embodiments, the MA directs the hypervisor to use the updated second VM instead of the first VM with the second VM by directing it to (1) detach a set of one or more data disks including application data from the first VM, and (2) attach the set of data disks to the updated second VM. This transfers the set of data disks needed to use the updated second VM instead of the first VM with the updated second VM rather than copying them and adding the copies to the second VM. In some embodiments, the MA also directs the hypervisor to use the updated second VM instead of the first VM with the second VM by directing the hypervisor to (1) archive the first VM to a data store of the hypervisor, and (2) migrate the updated second VM from the isolated network environment to a production network environment with a production network port group that enables the updated second VM to perform the particular set of operations once the compute downtime of the vehicle ends. The production network environment is associated with the VLAN used by the other VMs of the particular device, enabling the second VM to communicate with these VMs and any other VMs executing on other devices.

The compute downtime is detected in some embodiments by detecting a powering off of the vehicle. In other embodiments, the compute downtime is detected by detecting a powering off of the vehicle and a locking of the vehicle's doors. The hypervisor of the particular device is configured to operate in some embodiments during a particular time period after the compute downtime is detected. In such embodiments, the hypervisor is operational during the particular time period of time using a battery of the vehicle and is not operational after the particular time period. By directing the hypervisor to use the updated second VM instead of the first VM during the compute downtime, and by not performing the collecting, using, or updating during the compute downtime, the method uses minimal battery of the vehicle and completes the VM replacement in the minimum amount of time possible. This avoids impacting vehicle operations, should the vehicle's compute downtime be short in duration.

In some embodiments, the compute downtime ends at a start of a next vehicle compute period. The next vehicle compute period is in some embodiments a powering on of the vehicle. Once the vehicle is experiencing the next compute period, the updated second VM is used to perform the particular set of operations such that it functions as if the first VM were updated directly.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
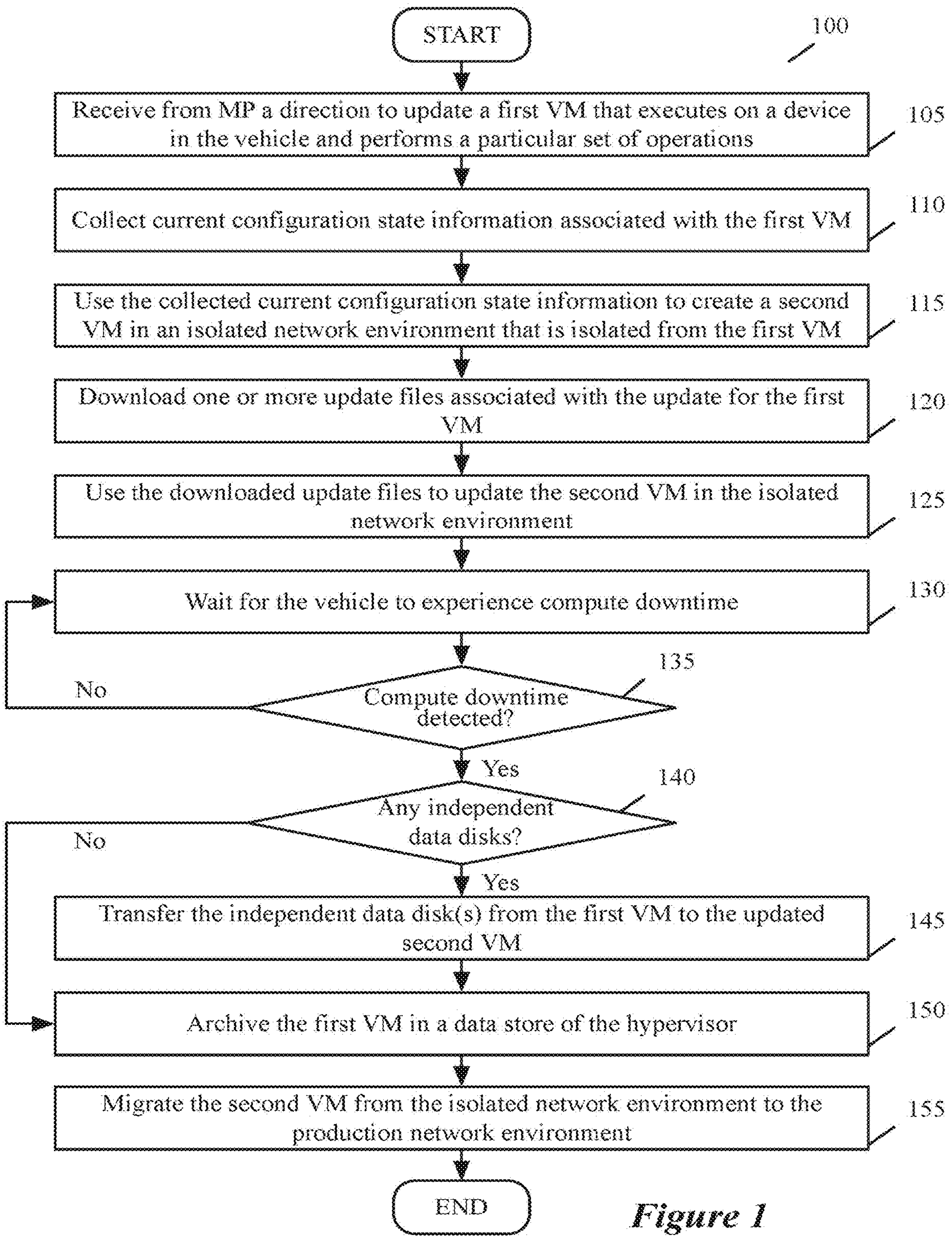
FIG. 1 conceptually illustrates a process of some embodiments for efficiently updating software of VMs executing on one or more devices in a vehicle such that updates to the software do not interrupt operations performed by the VMs.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for efficiently updating software of virtual machines (VMs) executing on one or more devices in a vehicle such that updates to the software do not interrupt operations performed by the VMs. While the vehicle operates, the method collects configuration state information of a first VM executing on a particular device and performing a particular set of operations. The method uses the configuration state information to instantiate a second VM in an isolated network environment that is isolated from the first VM. The second VM is identical to the first VM at a particular time the configuration state information was collected. The method updates the second VM. The method detects a compute downtime of the vehicle. During the compute downtime, the method uses the updated second VM on the device instead of the first VM such that the updated second VM performs the set of operations once the compute downtime ends.

In some embodiments, the method is performed by a management agent (MA) executing on the particular device. The MA is an application, program, or module executing on the particular device. In some embodiments, the isolated environment is an isolated network such that the second VM does not interfere with the particular set of operations performed by the first VM when the second VM is instantiated in the isolated network. The isolated environment is referred to as an isolated network, a sandbox, and a staging area in different embodiments, and allows for the creation and update of the second VM without interrupting the first VM and the operations it performs. In some embodiments, the particular device is a computer.

The isolated network environment is in some embodiments an isolated network associated with a private virtual local area network (VLAN) such that the second VM does not interfere with the particular set of operations performed by the first VM when the second VM is instantiated in the isolated network and before the compute downtime of the vehicle. In such embodiments, the isolated network is a private network segment within a virtual switch of the particular device's hypervisor using the private VLAN. The private VLAN is in some embodiments associated with a unique port group to ensure that traffic sent to and from the second VM does not collide with traffic sent to and from the first VM in a different VLAN, as they have the same Internet Protocol (IP) address.

The MA of the particular device performs the collecting, using, updating, and detecting after receiving direction to update the first VM from a management plane (MP) implemented by a set of one or more management servers that connect to the vehicle through a software-defined wide area network (SD-WAN). In such embodiments, the MP directs the MA to update the first VM, and the MA performs the collecting, using, updating, and detecting in order to update the first VM.

In some embodiments, the set of managers implementing the MP operates at a different location than the vehicle. For instance, the vehicle in some embodiments moves around different locations, while the set of management servers execute at an edge site of the SD-WAN. Alternatively, the set of management servers execute at a datacenter site of the SD-WAN. Still, in other embodiments, the set of management servers execute in a distributed fashion at two or more sites of the SD-WAN.

The vehicle in some embodiments includes an edge router that connects to the SD-WAN using a set of one or more wireless network connection links. The edge router of some embodiments is one of an edge router appliance, an edge router executing on a computer that operates in the vehicle, or an edge router executing on a machine that executes on the computer. The wireless network connection links are in some embodiments provided by one or more different telecommunication link providers (e.g., different cellular providers).

In some embodiments, the MA updates the second VM by directing the hypervisor of the particular device to direct an update agent associated with the second VM to download a set of one or more update files associated with a particular update for the first VM and update the second VM. In such embodiments, each VM instantiated on the particular device and each copy of each VM executes an update agent that performs software updates for its respective VM. The update agent in some embodiments downloads the set of update files from the MP using one or more of the set of wireless network connection links. In other embodiments, update agent in some embodiments downloads the set of update files from a set of one or more other locations specified by the MP (e.g., external repositories) using the set of wireless network connection links. The update operation performed by the update agent is in some embodiments referred to as a patching operation or a patch period.

The configuration state information in some embodiments includes an operating system (OS) disk of the first VM that specifies one or more OS files and application software related to the first VM at the particular time the configuration state information was collected. In such embodiments, the OS disk is copied at the particular time in order to freeze the state of the first VM and to create the second VM using the OS disk. The second VM is referred to in some embodiments as a duplicate of the first VM's configuration file. The first VM's configuration file and the copy of the first VM's configuration file are in some embodiments referred to as VMX files. In some embodiments, after copying the OS disk, the first VM write subsequent OS disk operations to a journal.

The MA collects the configuration state information in some embodiments by directing the hypervisor of the particular device to collect the OS disk at the particular time. In such embodiments, the MA receives notification from the MP to update the first VM, which causes the MA to direct the hypervisor to copy the first VM's OS disk. Then, the MA uses the configuration state information to instantiate the second VM by directing the hypervisor to use the OS disk to instantiate the second VM. In such embodiments, the OS disk is copied to create the second VM, but independent data disks are not copied. Data disks in some embodiments specify application data and do not specify software. Independent data disks in some embodiments are data disks that are labeled as independent, meaning that it will not be copied by the hypervisor.

Rather, when the second VM is to be used instead of the first VM, the hypervisor will instead transfer the first VM's independent data disks to the second VM. This is referred to in some embodiments as a zero-copy transfer, which enables the MA to update the first VM faster than if it were to direct the hypervisor to also copy the data disks of the first VM. Performing a zero-copy transfer of data disks from the first VM to the second VM is very rapid since none of this data is copied within the hypervisor system and since no heavy storage operations are required to detach and reattach data disks from the first VM to the second VM.

In some embodiments, the MA directs the hypervisor to use the updated second VM instead of the first VM with the second VM by directing it to (1) detach a set of one or more data disks including application data from the first VM, and (2) attach the set of data disks to the updated second VM. This transfers the set of data disks needed to use the updated second VM instead of the first VM with the updated second VM rather than copying them and adding the copies to the second VM. In some embodiments, the MA also directs the hypervisor to use the updated second VM instead of the first VM with the second VM by directing the hypervisor to (1) archive the first VM to a data store of the hypervisor, and (2) migrate the updated second VM from the isolated network environment to a production network environment with a production network port group that enables the updated second VM to perform the particular set of operations once the compute downtime of the vehicle ends. The production network environment is associated with the VLAN used by the other VMs of the particular device, enabling the second VM to communicate with these VMs and any other VMs executing on other devices.

The compute downtime is detected in some embodiments by detecting a powering off of the vehicle. In other embodiments, the compute downtime is detected by detecting a powering off of the vehicle and a locking of the vehicle's doors. The hypervisor of the particular device is configured to operate in some embodiments during a particular time period after the compute downtime is detected. In such embodiments, the hypervisor is operational during the particular time period of time using a battery of the vehicle and is not operational after the particular time period. By directing the hypervisor to use the updated second VM instead of the first VM during the compute downtime, and by not performing the collecting, using, or updating during the compute downtime, the method uses minimal battery of the vehicle and completes the VM replacement (or pivot period, as it is referred to in some embodiments) in the minimum amount of time possible. This avoids impacting vehicle operations, should the vehicle's compute downtime be short in duration.

In some embodiments, the compute downtime ends at a start of a next vehicle compute period. The next vehicle compute period is in some embodiments a powering on of the vehicle. Once the vehicle is experiencing the next compute period, the updated second VM is used to perform the particular set of operations such that it functions as if the first VM were updated directly.

By updating VMs executing on devices in a vehicle by cloning the VMs, updating the clones, and replacing the original VMs with the updated clones, the updates minimize interruptions of operations performed by the original VMs. This allows for a reduced maintenance outage of VMs, which is useful for lifecycle management of critical VMs (i.e., VMs whose operations are critical to the vehicle and/or the user). For example, police vehicles and first-responder vehicles execute VMs that perform various critical operations. By updating these VMs using clones, instead of updating them directly, interference with their operation is avoided.

FIG. 1 conceptually illustrates a process 100 of some embodiments for efficiently updating software of VMs executing on one or more devices in a vehicle, such that updates to the software does not interrupt operations performed by the VMs. This process 100 is performed in some embodiments by an MA executing along with a hypervisor on a particular device operating in the vehicle. In other embodiments, the MA executes as a microservice within the hypervisor. As used herein, the term hypervisor may refer generally to a software layer or component that supports the execution of multiple VMs including system-level software that supports name space containers. The particular device is in some embodiments a computer that executes several VMs that perform various operations. In some embodiments, the hypervisor includes applications, programs, and/or modules that perform operations as directed by the MA. The following steps 105-155 are in some embodiments performed in the order in which they are described. In other embodiments, they are performed in a different order. Still, in other embodiments, two or more steps are performed simultaneously.

The process 100 begins by receiving (at 105), from an MP, a direction to update a first VM that executes on the particular device and performs a particular set of operations. The MA receives, from the MP, a data message directing the MA to update (or patch, in some embodiments) the first VM. Patching a VM in some embodiments refers to making changes, making updates, or fixing the software of the VM. In some embodiments, the vehicle connects to an SD-WAN managed by a set of management servers that implement an MP for the SD-WAN. In such embodiments, the vehicle includes an edge router that connects to the SD-WAN using one or more wireless network connection links (e.g., mobile hotspot links), and the data message is received along one of the wireless network connection links. The edge router is one of (1) an edge router appliance, (2) an edge router that executes on a computer operating in the vehicle, or (3) an edge router that executes on a machine (e.g., a VM) that executes on the computer. The management servers in some of these embodiments reside in a particular site remote to the vehicle. In other embodiments, at least two management servers reside in at least two sites remote to the vehicle (i.e., the MP is implemented in a distributed fashion). The MA is implemented on the particular device in such embodiments to perform management operations as directed by the MP.

Next, the process (at 100) collects (at 110) current configuration state information associated with the first VM. The MA in some embodiments directs the hypervisor to collect the first VM's current configuration state information relating to the configuration of the first VM. In some embodiments, the current configuration state information includes an OS disk that specifies the OS files and application software related to the first VM. The current configuration state information collected for a VM is referred to in some embodiments as a snapshot. A snapshot of a VM is a point-in-time copy of the VM where its current OS disk is placed into a frozen state, and subsequent OS disk operations are written into to a journal (e.g., a data store local to the hypervisor) as the VM continues to operate. By copying and storing the OS disk at a particular time, at any time in the future, the VM is able to be restored back to the exact state at the particular time the snapshot was taken.

In some embodiments, the snapshot of the first VM is taken while the first VM is running. When a snapshot is taken while a VM is running, the snapshot in some embodiments also includes a copy of the active memory of the VM. In such embodiments, this is done so that restoration of the VM's snapshot is able to include the running memory state. In addition to restoring VMs using their snapshots, in some embodiments, new VMs can be instantiated using these snapshots of other VMs such that the new VMs are clones of (i.e., are identical to) the other VMs.

The collected configuration state information (i.e., the snapshot) in some embodiments does not include any disks associated with the first VM that are labeled as independent in the first VM's definition (i.e., in the file stored by the hypervisor defining the first VM). In such embodiments, the first VM is associated with a set of one or more data disks that stores critical data needed to run the first VM. These data disks are labeled as independent, and are therefore not copied by the hypervisor (as directed the MA) to minimize the amount of data that needs to be copied to create a duplicate of the first VM. Conversely, any data disks not labeled as independent in the first VM's definition are copied in the snapshot.

In some embodiments, the OS disk (which is not labeled as independent) includes a C drive for the first VM, and the independent data disks include a D drive and an E drive. In such embodiments, the C drive is copied in the configuration state information, and the D and E drives are not. As will be described below, the D and E drives will in some embodiments instead be transferred rather than copied.

At 115, the process 100 uses the collected current configuration state information to create a second VM in an isolated network environment that is isolated from the first VM. The MA directs the hypervisor to use the snapshot collected for the first VM (i.e., the OS disk of the first VM) to instantiate a second VM that is a clone of the first VM. This clone is a clone of the first VM at the exact time the configuration state information (i.e., the snapshot) was collected. In some embodiments, the second VM is instantiated in the isolated network environment (also referred to as an isolated network, staging area, or sandbox in some embodiments) such that it does not interfere with any operations performed by the first VM. The second VM is instantiated in the isolated network environment in some embodiments by provisioning (i.e., adding) a separate virtual switch to the particular device to connect to the second VM. In other embodiments, the second VM is instantiated in the isolated network environment by instantiating the second VM within a private network segment within the hypervisor's virtual switch using a private virtual local area network (VLAN). In such embodiments, the private VLAN is associated with a unique port group to ensure that traffic sent to and from the second VM does not collide with traffic sent to and from the first VM in a different VLAN, as they have the same Internet Protocol (IP) address.

Then, the process 100 downloads (at 120) one or more update files associated with the update for the first VM. In some embodiments, the MA directs an update agent associated with the second VM to download the update files from the MP. In such embodiments, the update agent operates within the second VM. In other embodiments, the MA directs the update agent to download the update files from one or more locations specified by the MP (e.g., one or more external repositories). Still, in other embodiments, the MA itself downloads the update files from the MP and provides them to the update agent. The update files are downloaded from the MP using one or more of the wireless network connection links of the vehicle's edge router. In some embodiments, the update files are downloaded by requesting (e.g., in an Application Programming Interface (API) request) the update files from the MP, and receiving the update files in a response (e.g., in an API response) from the MP.

Using the downloaded update files, the process 100 updates (at 125) the second file for the second VM in the isolated environment. In order to not interrupt operation of the first VM, the MA directs the update agent to update the second VM in the isolated network environment, as it is a clone of the first VM at the time the configuration state information was collected. The second VM is updated in some embodiments by using the update files to make application and/or OS changes to the second VM's OS disk. The update operation performed by the update agent is in some embodiments referred to as a patching operation or a patch period. Patching a VM in some embodiments refers to making changes, making updates, or fixing the software of the VM.

At 130, the process 100 waits for the vehicle to experience compute downtime. In some embodiments, instead of updating the first VM directly (which causes interruption of its operations), the MA directs updates the cloned second VM and replaces the first VM with the updated second VM when the first VM is not currently running. In such embodiments, the MA knows the first VM is not currently running when the vehicle is experiencing compute downtime (e.g., when the vehicle is turned off). In order for the MA to direct the replacement of the first VM with the updated second VM without interrupting the first VM's operations, the MA waits for the vehicle to experience the compute downtime. In some embodiments, the second VM is updated before the vehicle experiences the compute downtime (i.e., while the vehicle is running) so as to minimize use of the vehicle's battery during the compute downtime.

At 135, the process 100 determines whether the compute downtime for the vehicle has been detected. In some embodiments, the MA detects the compute downtime when the MA detects that the vehicle has experienced an ignition event. The ignition event is in some embodiments when the vehicle has been powered down (i.e., turned off). In other embodiments, the ignition event is when the vehicle has been powered down and the vehicle's doors have been locked.

If the process 100 determines that the compute downtime has not yet detected, the process 100 returns to step 130 to continue waiting for the vehicle to experience the compute downtime. The MA will not direct the replacement (or pivot, in some embodiments) of the first VM with the second VM until the vehicle's compute downtime has started. If the process 100 determines that the compute downtime has been detected, the process 100 determines (at 140) whether any data disks are associated with the first VM. As discussed previously, the collected configuration state information (i.e., the snapshot) for the first VM includes in some embodiments the OS disk for the first VM, and not any independent data disks. In such embodiments, the MA needs to transfer over the independent data disks from the first VM to the second VM because they were not previously copied to create the second VM. This is referred to in some embodiments as a zero-copy transfer of data, as the independent data disks are detached from the first VM and attached to the second VM, rather than copying them and attaching the copied data disks to the second VM. In other embodiments, the collected configuration state information included the OS disk and at least one data disk not labeled as independent (and therefore copied to create the second VM). In such embodiments, the MA determines which data disks, if any, are labeled as independent and need to be transferred to the second VM.

If the process 100 determines that no independent data disks are associated with the first VM, the process 100 proceeds to step 150, which will be described below. If the process 100 determines that there are one or more independent data disks associated with the first VM, the process 100 transfers (at 145) the independent data disk or disks from the first VM to the updated second VM. In some embodiments, the MA directs the hypervisor to detach the independent data disks from the first VM and attach them to the updated second VM. By doing so, the MA and the hypervisor successfully transfer the information needed for the updated second VM to run in place of the first VM without having to copy the information directly (i.e., saving compute time and power).

As discussed previously, when the configuration state information is collected, the first VM will then write subsequent OS disk operations to a journal. In such embodiments, the MA will not direct the copying of these OS disk files or transfer these OS disk files to the updated second VM, i.e., the second VM will not receive these OS disk files. This is done in some embodiments because this data is not significant to running the updated second VM in place of the first VM. In other embodiments, the MA directs the hypervisor to extract the subsequent OS disk files from the journal and provide them to the updated second VM.

Next, the process 100 archives (at 150) the first VM in a data store of the hypervisor. The MA in some embodiments directs the hypervisor to archive the first VM into its local data store such that the first VM can be re-instantiated in the future. For example, after replacing the first VM with the updated second VM (i.e., after the VM pivot period), the MP in some embodiments directs the MA to revert the first VM back to its state before the update occurred (e.g., if the update has a flaw). Because the first VM is archived, the MA is able to simply direct the hypervisor to power down the updated second VM, transfer the data disks back to the first VM, and power on the first VM. In some embodiments, after this is performed, the updated second VM is deleted. In other embodiments, after this is performed, the updated second VM is archived. The first VM is archived in some embodiments for a particular period of time (e.g., five days), and, after the particular period of time passes, the first VM is deleted from the archive. In other embodiments, the first VM is archived indefinitely.

At 155, the process 100 migrates the updated second VM from the isolated network environment to production network environment. To instantiate the updated second VM in place of the first VM, the MA directs the hypervisor to migrate the updated second VM to the production folder and the production network port group which allows it to communicate with other VMs (e.g., executing on the particular device, executing on other devices, etc.). After this, the updated second VM executes in the same VLAN as the first VM originally executed, and the updated second VM will perform the particular set of operations on the particular device that were previously performed by the first VM. After migrating the updated second VM from the isolated network environment to the production network environment, the process 100 ends.

In some embodiments, the steps 140-155 of the process 100 are performed during a particular time period after the compute downtime of the vehicle is detected (i.e., during a particular time period after the vehicle is powered off). In such embodiments, during the particular time period, the hypervisor is operational using a battery of the vehicle. In embodiments where the particular device includes a OS (i.e., when the hypervisor is not the OS itself) the OS is in some embodiments also operational using the battery during the particular time period. After the steps 140-155 are performed and after the particular time period ends, the hypervisor (and the OS in some embodiments) is powered off until the vehicle's compute downtime ends at the start of the next vehicle compute period (i.e., until the vehicle is powered back on).

When the next vehicle compute period begins (e.g., the next time the vehicle is turned on), the updated second VM will perform the particular set of operations previously performed by the first VM. In some embodiments, the archive of the first VM is stored in the data store for a particular period of time (e.g., seven days) and is deleted from the data store after the particular period of time ends.

By performing the VM update while the vehicle is operating and by performing the pivot of the first VM with the updated second VM while the vehicle is not operating, the MA minimizes the hypervisor's use of the vehicle's battery, as VM updates in some embodiments are time consuming. For this reason, the cloned VM is updated ahead of time, and only the transferring of independent data disks, the archival of the first VM, and the migration of the updated second VM) is performed using the vehicle's battery.

Figure 2:
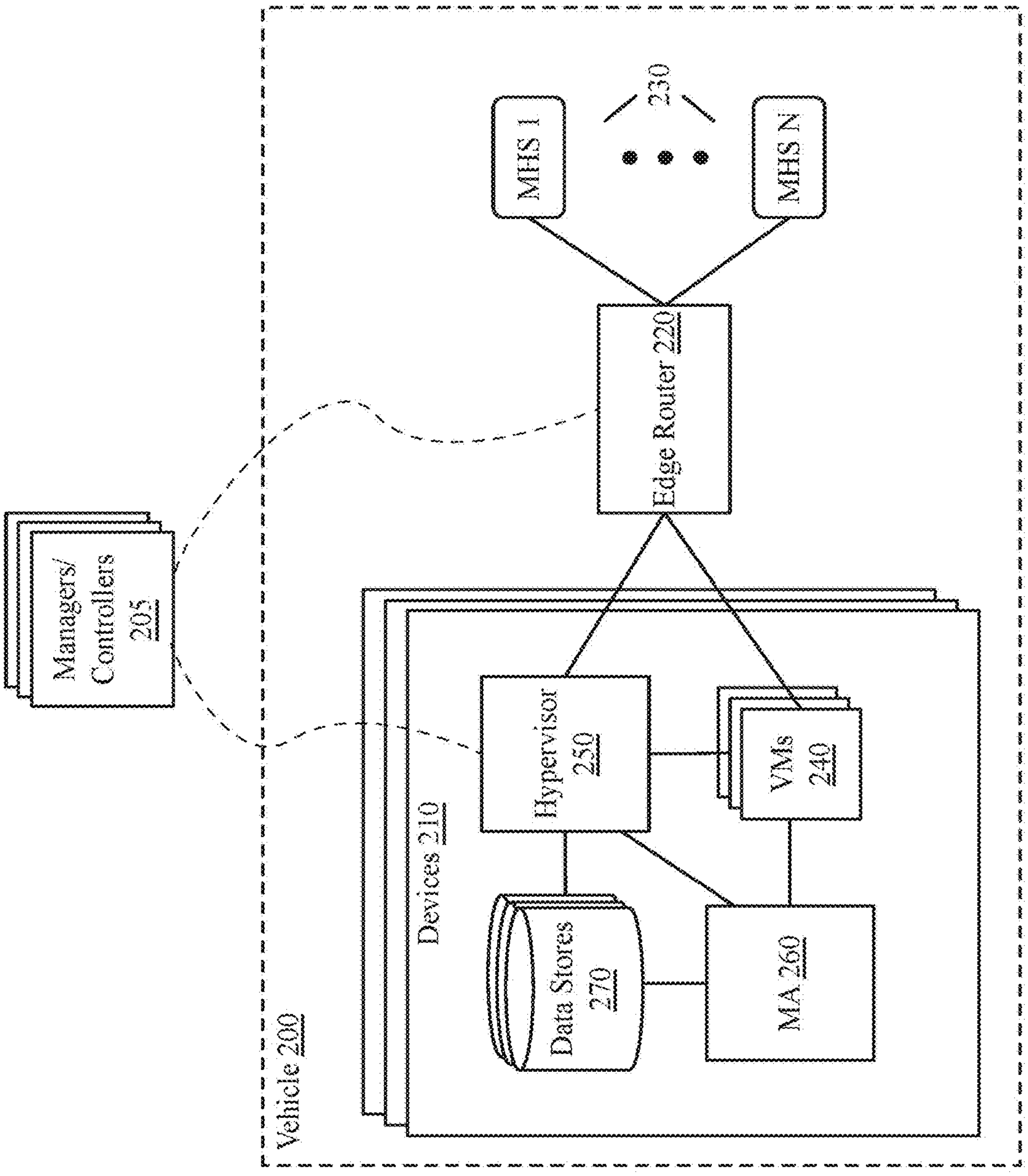
FIG. 2 illustrates an example vehicle including components managed and configured by a set of managers and controllers.

FIG. 2 illustrates an example vehicle 200 including components managed and configured by a set of managers and controllers 205. In this example, the vehicle 200 includes a set of one or more devices 210 and an edge router 220 that connects to the manager and controller set 205 using a set of one or more wireless network connection links 230. The edge router 220 can use any number of wireless network connection links 230 provided by any number of cellular providers to connect to the manager and controller set 205.

The manager and controller set 205 is in some embodiments a set of management servers that implement an MP and a set of controllers that implement a control plane (CP) of an SD-WAN that connects to the vehicle 200. The manager and controller set 205 operates in a different location than the vehicle 200, such as at a public or private cloud datacenter. Further information regarding managers, controllers, and an SD-WAN connected to a vehicle will be described below.

The vehicle 200 includes a set of one or more devices 210. In some embodiments, the devices 210 are a set of computers. Each device 210 in some embodiments includes a set of one or more machines 240, a hypervisor 250, an MA 260, and a set of one or more data stores 270. A device 210 can execute any number of machines 240. In some embodiments, the machines 240 are at least one of VMs, containers, and Pods. Each VM 240 in some embodiments performs a set of operations for a set of one or more applications. These operations are in some embodiments directed to be performed by a user of the vehicle 200, e.g., through a web interface provided by a web server running in the machines 240. While the MA 260 is illustrated in this figure as a separate module from the hypervisor 250, in other embodiments, the MA 260 executes within the hypervisor 250 (e.g., as a microservice).

For example, police vehicles in some embodiments include devices that execute VMs to perform various functions, such as 1) license and registration verification, 2) video streaming of in-vehicle cameras and body worn cameras, 3) forensic data gathering (e.g., collection of crime victim phone images and associated analysis), 4) logging and security functions for the vehicle itself (along with logistical information communicated to in-vehicle operators about their immediate mission), and 5) data synchronization to a cloud from in-vehicle sources.

In some embodiments, one or more of the VMs 240 perform critical operations that cannot experience a large amount of downtime during the vehicle's compute period in order to be updated. In order to minimize the downtime experienced by one or more of the VMs 240 executing in the vehicle 200, the manager and controller set 205 (i.e., the MP) in some embodiments directs the MA 260 to update the VMs 240 by directing the hypervisor 250 to clone VMs, initiate updates to the cloned VMs, and replace (i.e., pivot) the original VMs with the updated cloned VMs (such as in the process 100 of FIG. 1).

As directed by the MA 260 (i.e., after the MA 260 was notified by the manager and controller set 205 of an update for one of the VMs 240), the hypervisor 250 executing on the same device 210 collects the configuration state information (i.e., the OS disk or C drive) for the VM to create a cloned file in an isolated network environment, updates the cloned file (e.g., using an update agent of the cloned VM), transfers any independent data disks (e.g., D drive, E drive) from the VM to the updated cloned VM, archives the original VM, and migrates the updated cloned VM to the production network environment. In some embodiments, the updated cloned VM's files (i.e., the OS disk, one or more dependent data disks) are stored in the set of data stores 270 such that the updated cloned VM is stored in the set of data stores 270 along with other VMs executing on the device 210. In other embodiments, the updated cloned VM's files are stored in a different data store local to the hypervisor 250.

In some embodiments, the original VM's file is archived to a data store that is different than the data stores 270 but is local to the hypervisor 250. In other embodiments, the original VM's file is archived to the set of data stores 270. In this example, the hypervisor 250 is the OS of the device 210 (i.e., Type 1 hypervisor). However, in other embodiments, a separate device OS executes on the device 210 along with the hypervisor 250 (i.e., Type 2 hypervisor).

Figure 3:
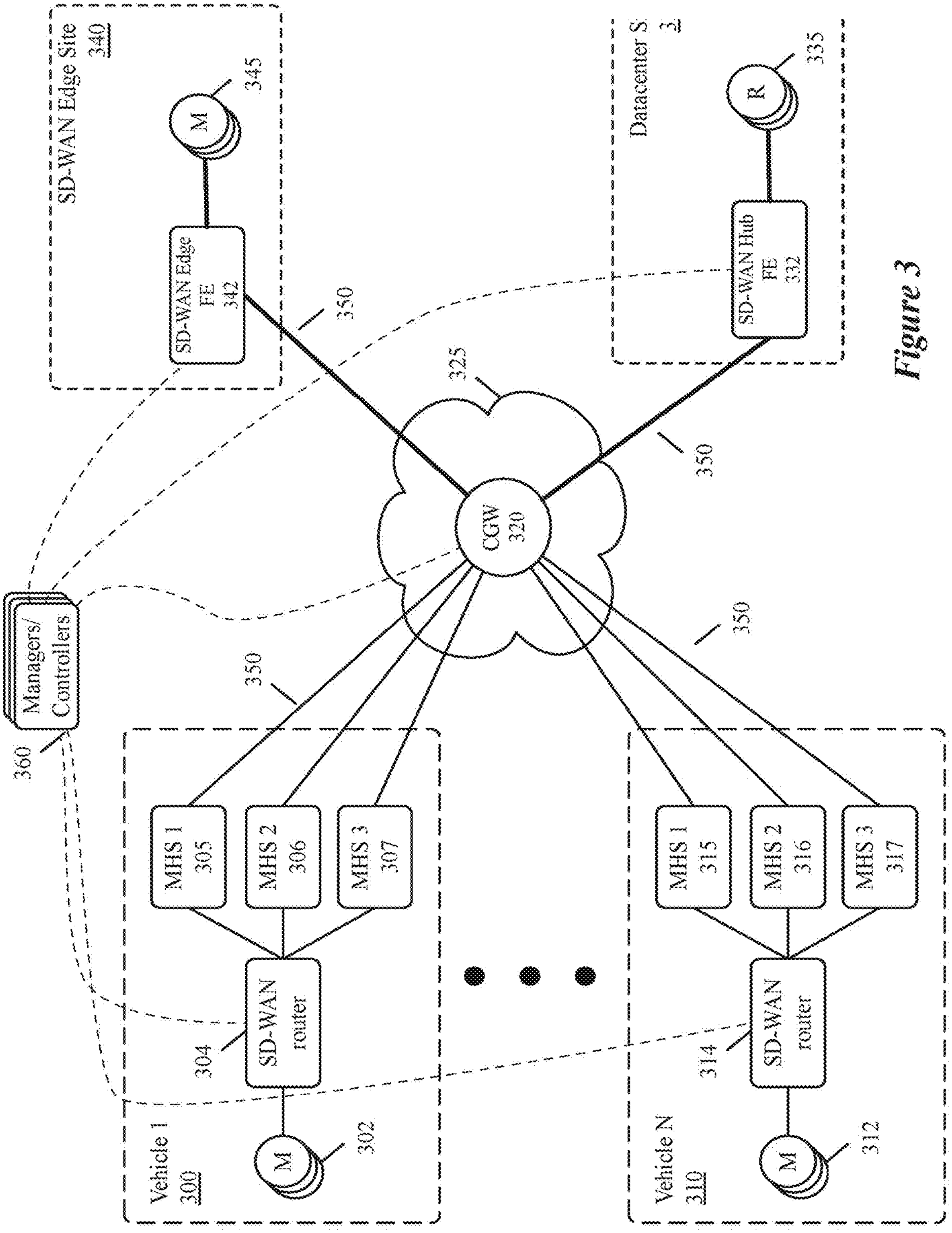
FIG. 3 illustrates an example of vehicles that communicate with various components of an SD-WAN.

As discussed previously, a vehicle in some embodiments connects to an SD-WAN. FIG. 3 illustrates an example of vehicles 300 and 310 that communicate with various components of an SD-WAN. Any number of vehicles 1-N may be used. The vehicles 300 and 310 respectively include sets of one or more compute machines 302 and 312, SD-WAN routers 304 and 314, and network links 305-307 and 315-317. The SD-WAN connects a cloud gateway (CGW) 320, a datacenter site 330, and an edge site 340.

The CGW 320 in some embodiments is a forwarding element that is in a private or public datacenter 325. The CGW 320 in some embodiments has secure connection links (e.g., tunnels) with edge forwarding elements (e.g., SD-WAN edge FE 342) at multi-machine sites (e.g., SD-WAN edge site 340 with multiple machines 345), such as branch offices, datacenters, etc. These multi-machine sites are often at different physical locations (e.g., different buildings, different cities, different states, etc.) and are referred to in some embodiments as multi-machine sites or nodes. Two multi-machine sites 330 and 340 are illustrated in this figure, with one of them being an edge site 340 (e.g., a branch site), and one being a datacenter site 330. The edge site is shown to include an edge forwarding node 342, while the datacenter site 330 is shown to include a hub forwarding node 332. The edge forwarding element (e.g., SD-WAN edge FE 342) exchanges data messages with one or more CGWs 320 through one or more connection links 350 (e.g., multiple connection links available at the edge forwarding element).

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network). In some embodiments, the different physical links between the edge node 342 and the CGW 320 are the same type of links (e.g., are different MPLS links).

In some embodiments, the edge forwarding node 342 also has multiple direct links 350 (e.g., secure connection links established through multiple physical links) to a datacenter hub node 332. Again, the different links in some embodiments can use different types of physical links or the same type of physical links. Also, in some embodiments, the edge forwarding node 342 of the branch site can connect to a SD-WAN router of a vehicle (1) directly through one or more links 350, or (2) through a CGW or datacenter hub to which the edge forwarding node connects through two or more links 350. Hence, in some embodiments, the edge forwarding node 342 of the branch site 340 can use multiple SD-WAN links 350 to reach an SD-WAN router (e.g., 304) of a vehicle (e.g., 300), or a hub forwarding node 332 of a datacenter site 330.

The cloud gateway 320 in some embodiments is used to connect an SD-WAN router of a vehicle (e.g., SD-WAN router 314 of vehicle 310) to an SD-WAN forwarding node (e.g., edge forwarding element 342) through at least two secure connection links 350 between the CGW 320 and the SD-WAN router and between the CGW 320 and the forwarding element at the SD-WAN site (e.g., branch site 340 or datacenter site 330). In some embodiments, the CGW 320 also provides network data from a vehicle to a multi-machine site or from one multi-machine site to another multi-machine site (e.g., provides the accessible subnets of one site to another site). Like the CGW 320, the hub forwarding element 332 of the datacenter 330 in some embodiments can be used to connect an SD-WAN forwarding node 342 of a branch site to an SD-WAN router of a vehicle through at least two secure connection links 350 between the hub 332 and the SD-WAN router and between the hub 332 and the forwarding element at the branch site 340.

In some embodiments, each edge forwarding element, hub, and CGW in an SD-WAN (such as the edge forwarding element 342, the datacenter hub forwarding element 332, and the CGW 320) includes a router that performs the data message forwarding operations of the edge forwarding element, hub forwarding element, or CGW. In such embodiments, the next-hop forwarding records of these edge forwarding elements, hub forwarding elements, and CGWs are routing records used by the routers to forward data messages through the SD-WAN.

Each edge forwarding element of an edge site (such as the edge forwarding element 342 of the edge site 340) in some embodiments connects to an external network through two or more forwarding devices (e.g., an MPLS device, a cable modem router, a 5G router) of two or more communication service providers (e.g., a telephone company provider of an MPLS network, a cable modem provider of an ISP (Internet Service Provider), a wireless provider for the 5G connectivity). In some of these embodiments, each edge forwarding element connects to the forwarding devices of the service providers through two or more physical ports of the edge forwarding element.

In some embodiments, each secure connection link between two SD-WAN forwarding nodes (i.e., CGW 320 and edge forwarding node 342) is formed as a VPN (virtual private network) tunnel between the two forwarding nodes. In this example, the collection of the SD-WAN forwarding nodes (e.g., forwarding element 342 and CGW 320) and the secure connections 350 between the forwarding nodes forms a virtual network for a particular entity that spans at least public or private cloud datacenter 325 to connect the datacenter and edge sites 330 and 340.

In some embodiments, secure connection links are defined between gateways in different public cloud datacenters to allow paths through the virtual network to traverse from one public cloud datacenter to another, while no such links are defined in other embodiments. Also, in some embodiments, the CGW 320 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate data message flows that it receives from edge forwarding elements of one entity from data message flows that it receives along other tunnels of other entities. In other embodiments, gateways are single-tenant and are specifically deployed to be used by just one entity.

FIG. 3 illustrates a cluster of managers and controllers 360 that serves as a central point for managing (e.g., defining and modifying) configuration data that is provided to the edge nodes and/or gateways to configure some or all of the operations. In some embodiments, this manager and controller cluster 360 is in one or more public cloud datacenters, while in other embodiments it is in one or more private datacenters. In some embodiments, the manager and controller cluster 360 has a set of manager servers that define and modify the configuration data, and a set of controller servers that distribute the configuration data to the edge FEs, hubs and/or gateways. In some embodiments, the manager and controller cluster 360 facilitates updates to the machines 302 and 312 by providing configuration data to the vehicles 300 and 310. The update configuration data is used by MAs and hypervisors executing on the devices that execute the machines 302 and 312 to update the machines 302 and 312.

Figure 4A:
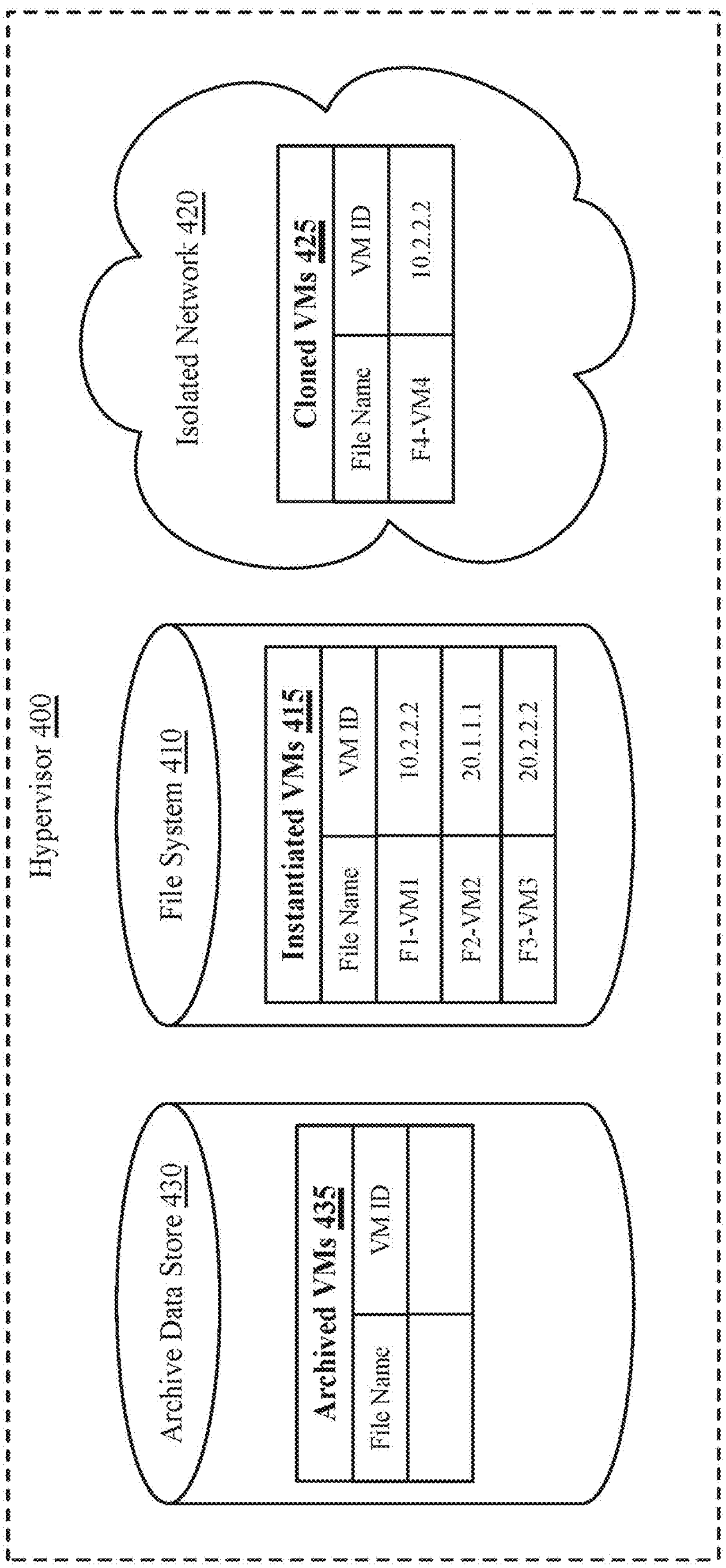
FIGS. 4A-B illustrate an example hypervisor of a device that uses a file system, an isolated network, and an archive data store to update VMs without interrupting operations the VMs perform.
Figure 4B:
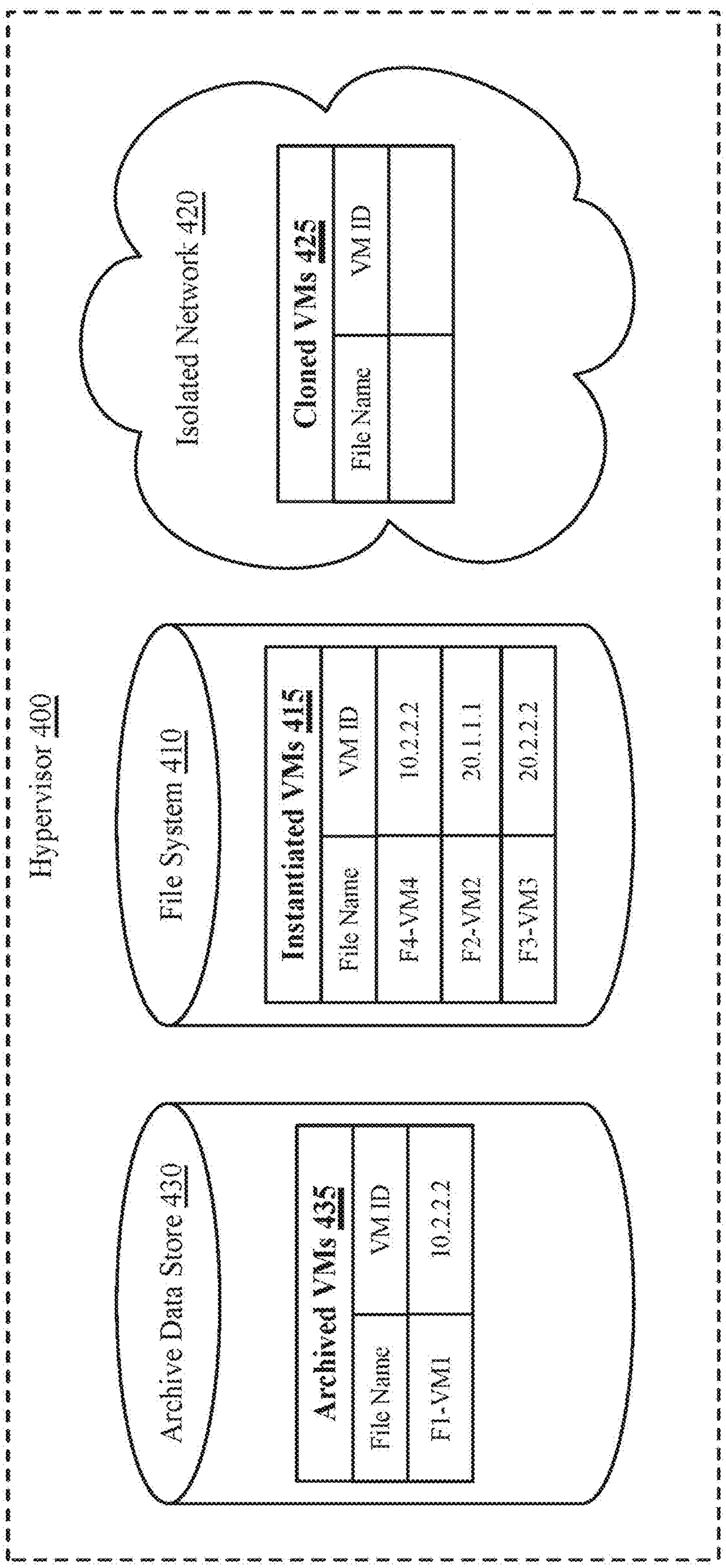

In some embodiments, a cloned VM (i.e., a copy of a running VM) is instantiated in an isolated network environment within the hypervisor before it replaces the original VM in the hypervisor file system in order to update the original VM without interrupting its operations. FIGS. 4A-B illustrate an example hypervisor 400 of a device (not shown) that uses a file system 410, an isolated network 420, and an archive data store 430 to update VMs executing in a vehicle without interrupting the operations the VMs perform during periods of computation.

The hypervisor 400 instantiates copies of VMs (i.e., clones of VMs) in an isolated network 420. In some embodiments, the isolated network 420 is referred to as an isolated network environment, a staging area, or a sandbox, and allows for the hypervisor 400 to instantiate copies of VMs without the copied VMs interfering with the VMs from which they were copied. The isolated network 420 includes in some embodiments a table 425 that maintains files for copied VMs. The hypervisor 400 is able to update the copied VMs using their associated files stored in the table 425 by using an update agent that downloads update files from an MP and/or one or more other locations specified by the MP (e.g., external repositories).

The hypervisor 400 configures VMs executing on the device using its file system 410. In some embodiments, the file system 410 is a data store that stores a table 415 including entries for each instantiated VM. Each file for a VM includes, in some embodiments, a file name and an identifier (ID) for the file's VM. In some embodiments, the ID is a universally unique ID (UUID). In other embodiments, it is a network address (e.g., a Media Access Control (MAC) address, an IP address) associated with the VM. In some embodiments, each VM file also includes the OS disk (e.g., C drive) and one or more data disks (e.g., D drive, E drive) associated with the VM.

The hypervisor 400 stores archived VM files in the archive data store 430. The archive data store 430 includes, in some embodiments, a table that stores the archived VM files. In this example, the hypervisor is the OS of the device (i.e., Type 1 hypervisor) and stores the archived VM files in the archive data store 430. Alternatively, when a separate device OS executes along with the hypervisor 400 (i.e., Type 2 hypervisor), the OS in some embodiments directs the hypervisor 400 to store the archived VM files in the archive data store 430. In other embodiments, even when a separate device OS executes along with the hypervisor 400, the hypervisor 400 directly stores the archived VM files in the archive data store 430 without being directed to do so by the OS.

FIG. 4A illustrates the file system 410, isolated network 420, and archive data store 430 after a first VM (VM1) has been copied but before the first VM is replaced with the copy (VM4). As shown, the hypervisor 400 stores the original VM's file F1-VM1 in the file system 410. The hypervisor 400 has created a copy of the original VM (F4-VM4) in the isolated network 420. It can be seen that the VM file stored in the isolated network 420 is a copy of the original VM1 because they share the same VM ID (IP address 10.2.2.2). The hypervisor 400 is able to make any updates to the copied VM4 (e.g., using an update agent executing within the copied VM4) without interfering with the operations of the original VM1. The archive data store 430 does not store any VM files, meaning that no VMs have been archived from the device and archived to the data store 430.

FIG. 4B illustrates the file system 410, isolated network 420, and archive data store 430 after the VM1 is replaced with the copied (and, in some embodiments, updated) VM4. As shown, VM4's file has been removed from the isolated network 420 and added to the hypervisor file system 410 (i.e., the hypervisor's production data store). VM1's file has been removed from the hypervisor file system 410 and added to the archive data store 430. After VM1 has been archived and VM4 has been added to the hypervisor production data store 410, the cloned VM4 is now able to perform the same operations VM1 used to perform on the device.

Figure 5:
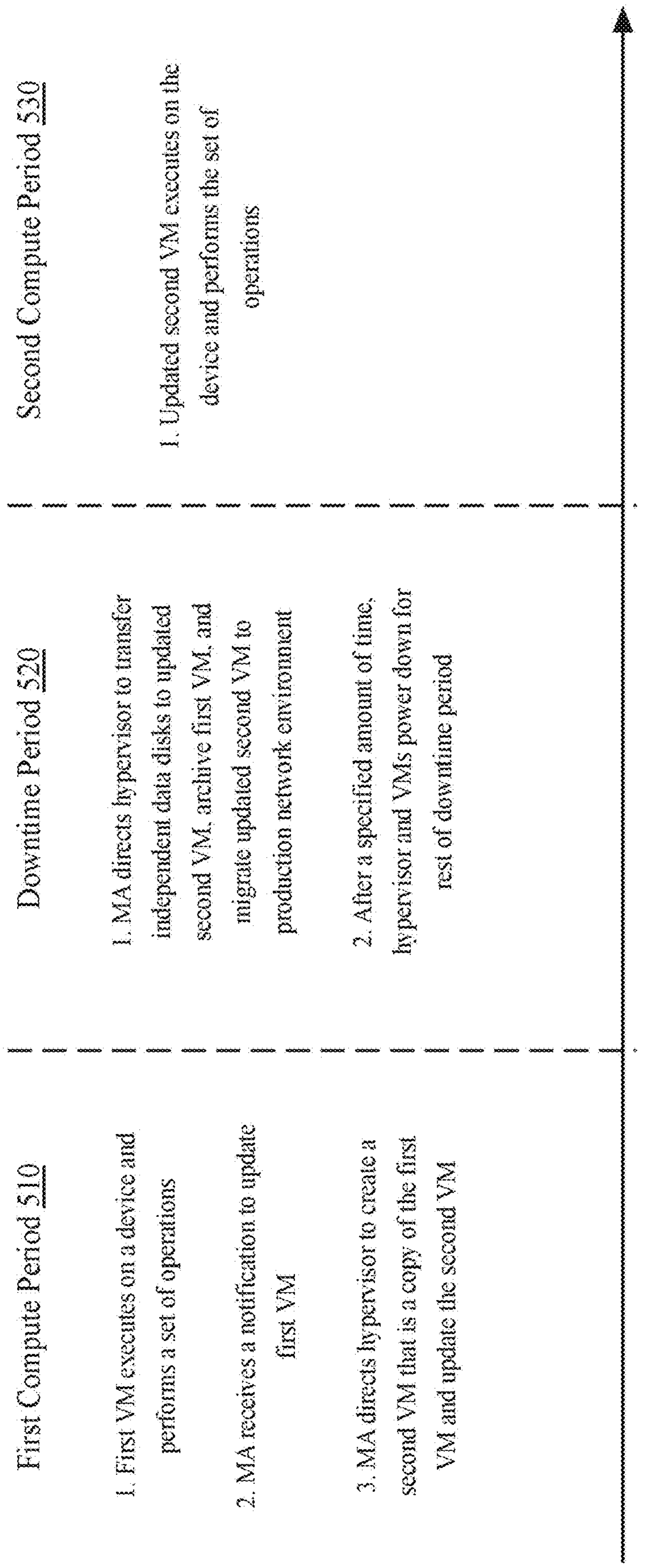
FIG. 5 illustrates three time periods that occur when an MA directs a hypervisor of a vehicle device to update a first VM by creating and updating a second VM.

As discussed previously, a copy of a VM (i.e., a copy of a VM's OS disk) is created and updated during a vehicle's compute period, and the copy of the VM is configured for operation (i.e., the independent data disks are transferred) during the vehicle's downtime period. FIG. 5 illustrates three time periods 510-530 that occur when a hypervisor of a vehicle device updates a first VM by creating and updating a second VM (as directed to by an MA of the vehicle device). The first time period 510 is a first compute period of the vehicle. In some embodiments, the first compute period 510 is when the vehicle, the devices in the vehicle, and the VMs executing on the devices are running. In other embodiments, the first compute period 510 is when the vehicle is not running itself, but the devices in the vehicle and the VMs executing on the devices are running (e.g., using the vehicle's battery).

During the first compute period 510, the first VM executes on a device in the vehicle and performs a set of operations. For example, a user in the vehicle in some embodiments directs the first VM to perform a particular set of services (e.g., data analysis services, data streaming services, messaging services, etc.). The hypervisor receives notification (e.g., from an MA) that it needs to (1)) create a second VM (e.g., in a network environment isolated from the first VM) that is a copy of the first VM (i.e., that is a copy of the first VM's OS disk), and (2) update the second VM. The MA directs the hypervisor to do this after receiving direction from an MP to update the first VM. After the hypervisor performs these operations, it waits to receive direction from the MA to replace the first VM with the second VM. The MA waits for the first compute period 510 to end before directing the hypervisor to replace the first VM with the second VM.

After the first compute period 510 ends, the vehicle begins its second time period, which is a downtime period 520. In some embodiments, the downtime period 520 begins when the vehicle is powered down. In other embodiments, the downtime period 520 begins when the vehicle is powered down and the doors of the vehicle are locked (i.e., indicating that the user of the vehicle has turned off and exited the vehicle). During the downtime period 520, even though the vehicle is powered down, the hypervisor of the device in the vehicle operates for at least some of the downtime period using the vehicle's battery. For example, the hypervisor operates on the vehicle's battery for five minutes after the downtime period 520 begins.

During the downtime period 520 and while the hypervisor is running on the vehicle battery, the MA directs the hypervisor to use the updated second VM on the device instead of the first VM. In some embodiments, the hypervisor does so by transferring any independent data disks associated with the first VM to the second VM, archiving the first VM, and migrating the updated second VM from the isolated network environment to its production network environment. Also during the downtime period 520, and after the second VM has been configured by the hypervisor, the MA powers down any non-essential VMs for the rest of the downtime period 520. After the specified amount of time for which the device's hypervisor uses the vehicle's battery passes, all VMs executing on the device and the hypervisor power down. In some embodiments, the VMs and hypervisor are set to power down after a particular period of time so as to avoid the need to fully power down and power on the vehicle's device in the event of a short downtime period. Doing updates prior to the downtime period allows for the hypervisor to rapidly replace the first VM with the updated second VM while the first VM is not running and not use a large amount of the vehicle's battery or require an extended downtime to complete software updates.

After the downtime period 520 ends, the vehicle experiences its third time period, which is a second compute period 530. In some embodiments, the second compute period 530 begins when the vehicle, the devices in the vehicle, and the VMs executing on the devices are powered back on. In other embodiments, the second compute period 530 begins when the vehicle is not running itself, but the devices in the vehicle and the VMs executing on the devices are powered back on (e.g., using the vehicle's battery).

During the second compute period 530, because the first VM was replaced with the updated second VM, the updated second VM now executes on the device and performs the set of operations. Now, the updated second VM performs the set of operations according to the update as if the first VM were to perform them if it has been updated directly.

Figure 6:
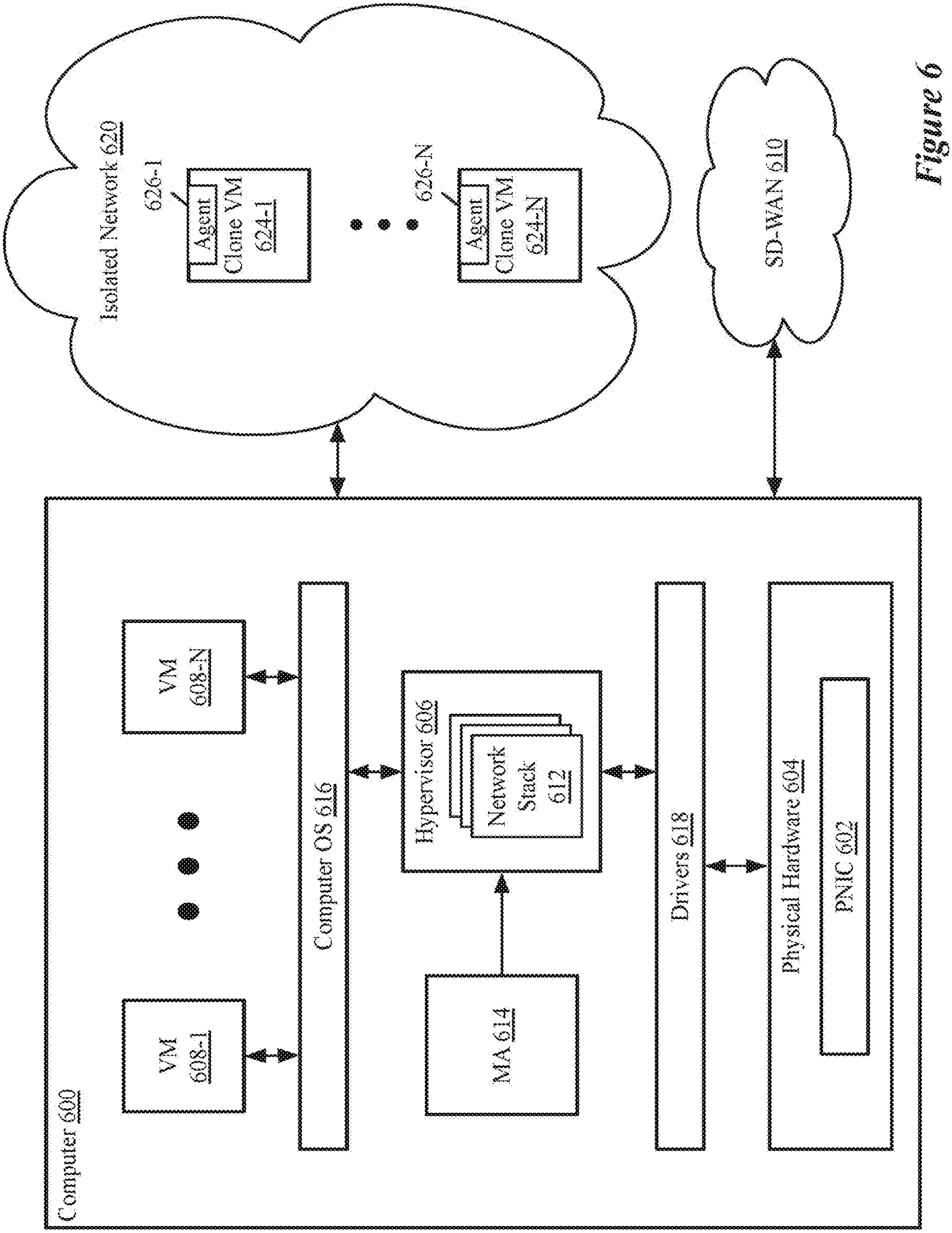
FIG. 6 illustrates an example host computer that executes VMs and updates the VM without interfering with their operations.

FIG. 6 illustrates an example host computer 600 that executes VM 606-1-N and updates the VMs without interfering with their operations. The host 600 in some embodiments executes in a vehicle and connects to other computers executing in the same vehicle, other computers executing in other vehicles, and/or machines (e.g., VMs, containers, Pods) and forwarding elements (e.g., routers) executing at sites (e.g., branch sites, edge sites, datacenter sites, cloud sites) through an SD-WAN 610. The host 600 in some embodiments performs processing of network traffic (e.g., data messages).

In some embodiments, the host 600 includes a hypervisor 606. In this example, the hypervisor 606 executes along with a computer OS 616 (i.e., Type 2 hypervisor). However, in other embodiments, the hypervisor 606 is the OS of the computer 600 (i.e., Type 1 hypervisor). The host 600 provides resources to allow VMs 608 to send and receive data messages to and from the SD-WAN 610. In some embodiments, the hypervisor 606 includes a network stack 612 for each VM 608 that processes data messages. The network stack 612 in some embodiments performs operations on the data messages in software using the hypervisor 606. The operations that are performed are in some embodiments defined by protocols, such as Transfer Control Protocol/Internet Protocol (TCP/IP). The network stack 612 includes, in some embodiments, an input/output (I/O) chain that performs network operations related to the delivery and reception of data messages as well as other operations.

The host 600 also includes physical hardware 604, which includes hardware devices for the host 600, such as central processing units (CPUs), storage, etc. The physical hardware 604 also includes a physical network interface card (PNIC) 602, which is in some embodiments the physical interface for the host 600 to connect to the SD-WAN 610. For example, the PNIC 602 is an interface that is used to send data messages from VMs 608 to the SD-WAN 610 (e.g., through an edge router executing in the vehicle) and also to receive data messages from the SD-WAN 610 that are destined to the VMs 608. In the receive scenario, the PNIC 602 includes queues (not shown) that store data messages that the PNIC 602 receives. Queues buffer the incoming data messages that are received from the SD-WAN 610, but the queue may also perform other operations. Then, drivers 618 read the data messages corresponding to queues for further processing by the network stack 612.

Note that the above explanation, and other explanations herein, may reflect a common interpretation or abstraction of actual processing mechanisms. For instance, data messages may not actually be stored in queues, but instead descriptors or pointers to data messages (that are actually stored in host memory) may be stored in the queue. It is conventional to refer to these descriptors/pointers that identify a data message as the data messages themselves to abstract away complexity and explain higher level operations without burdening the reader with unnecessary technical details of well understood mechanisms. Such abstractions in the descriptions herein should not be construed as limiting in any way.

In some embodiments, the hypervisor copies, updates, and replaces VMs as directed to by an MA 614. In such embodiments, the MA 614 receives notification from a set of management servers (not shown) implementing an MP to update a VM. The MA 614 then directs the hypervisor 606 to clone the VM (i.e., copy the OS disk and any data disks not labeled as independent), instantiate the clone VM in the isolated network 620, update the clone VM (e.g., using the VM's update agent 626), and replace the VM with the updated clone VM on the computer 600. While the MA 614 is illustrated in this figure as a separate module of the computer 600 from the hypervisor 606, in other embodiments, the MA 614 executes within the hypervisor 606.

As discussed previously, in some embodiments, a hypervisor of a device directs an update agent associated with a clone VM to download one or more update files from an MP and/or one or more other locations specified by the MP. Each clone VM 624 in the isolated network 620 includes an update agent 626 for retrieving update files associated with their VM 624. For example, the MA 614 in some embodiments receives a notification to update a particular VM 608-1. After receiving this notification, the MA 614 directs the hypervisor 606 to clone the VM 608-1. After the hypervisor 606 creates a clone of the VM 608-1 as clone VM 624-1, the MA 614 directs the hypervisor 606 to direct the update agent 626-1 to retrieve, from the MP through the SD-WAN 610, update files needed for updating the VM 624-1.

The agent 626-1 retrieves the necessary update files uses them to update the clone (or patch, in some embodiments) VM 624-1. Then, once the MA 614 detects a compute downtime of the computer 600, the MA 614 directs the hypervisor 606 to replace the original VM 608-1 with the updated clone VM 624-1.

By updating VMs executing on devices in a vehicle by cloning the VMs, updating the clones, and replacing the original VMs with the updated clones, the updates do not interrupt operations performed by the original VMs. This allows for a reduced maintenance outage of VMs, which is important for lifecycle management of critical VMs (e.g., VMs executing in first responder or police vehicles). In some embodiments, it eliminates maintenance outages because of the rapid VM swap operation performed when the vehicle is in a downtime period (e.g., when the vehicle is powered off). This results in a zero-downtime update operation, which can be performed for critical VMs implementing critical applications for the user of the vehicle.

The above described embodiments are applicable to many different types of devices operating on different types of vehicles, such as police vehicles, fire department vehicles, and first responder vehicles (e.g., ambulances). However, any other type of vehicle can be used. Any type of vehicle that includes computers operating within them that connect to an SD-WAN to access resources at another site can implement the above described embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
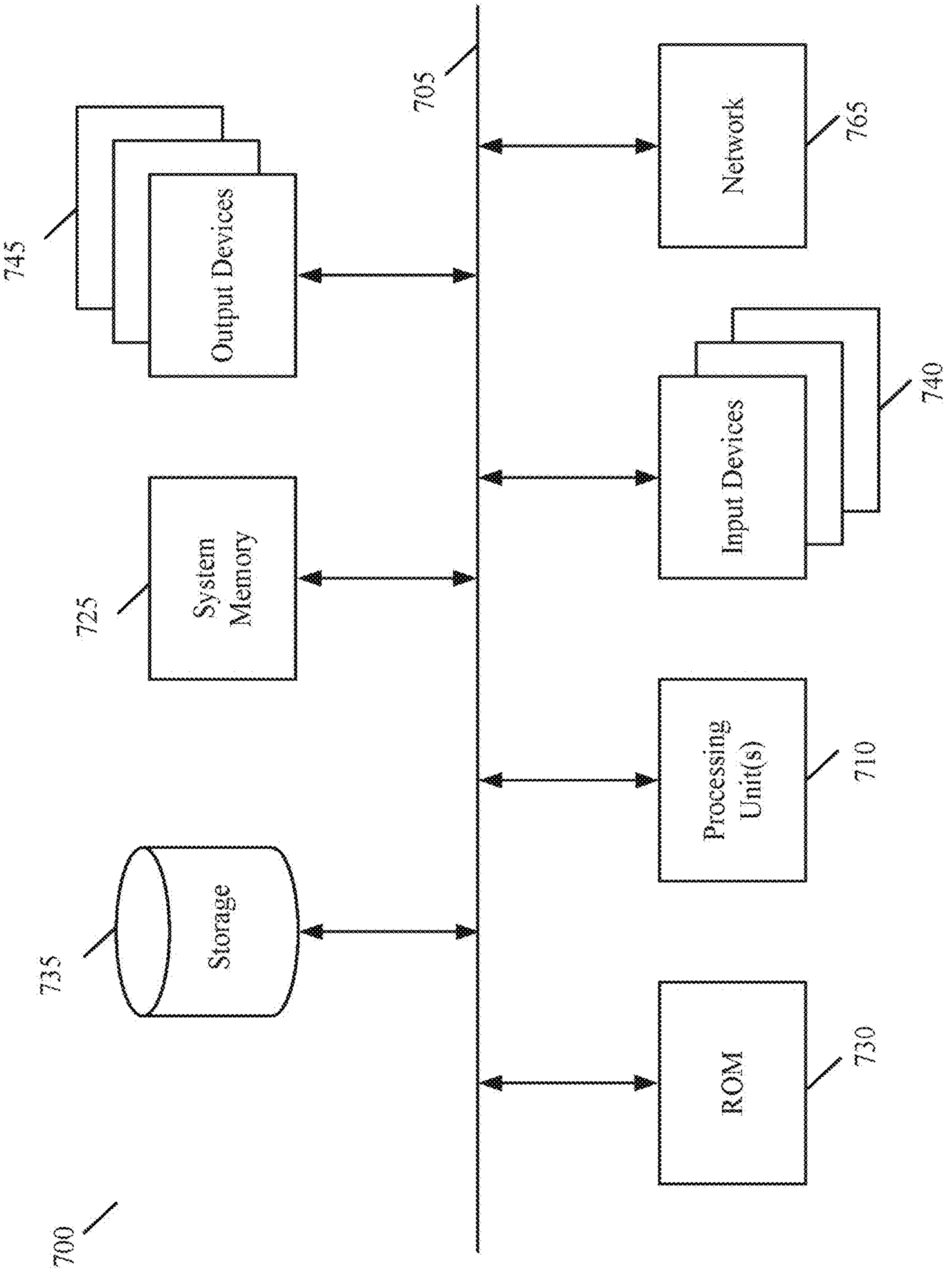
FIG. 7 conceptually illustrates an electronic system with which some embodiments of the invention are implemented.

FIG. 7 conceptually illustrates a computer system 700 with which some embodiments of the invention are implemented. The computer system 700 can be used to implement any of the above-described computers and servers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms “computer”, “server”, “processor”, and “memory” all refer to electronic or other technological devices. These terms exclude people or groups of people. For the purposes of the specification, the terms display or displaying means displaying on an electronic device. As used in this specification, the terms “computer readable medium,” “computer readable media,” and “machine readable medium” are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for efficiently updating software of virtual machines (VMs) executing on one or more devices in a vehicle such that updates to the software do not interrupt operations performed by the VMs, the method comprising:

while the vehicle operates:

collecting configuration state information of a first VM executing on a particular device, the first VM performing a particular set of operations;

using the configuration state information to instantiate a second VM in an isolated network environment that is isolated from the first VM, the second VM being identical to the first VM at a particular time the configuration state information was collected; and updating the second VM;

detecting a compute downtime of the vehicle; and during the compute downtime of the vehicle, using the updated second VM on the particular device instead of the first VM such that the updated second VM performs the particular set of operations once the compute downtime of the vehicle ends.

2. The method of claim 1, wherein the isolated network environment is an isolated network associated with a private virtual local area network (VLAN) such that the second VM does not interfere with the particular set of operations performed by the first VM when the second VM is instantiated in the isolated network and before the compute downtime of the vehicle.

3. The method of claim 1, wherein the collecting, using, updating, and detecting are performed by a management agent (MA) of the particular device after receiving direction to update the first VM from a management plane (MP) implemented by a set of one or more management servers that connect to the vehicle through a software-defined wide area network (SD-WAN).

4. The method of claim 3, wherein the set of management servers operates at a different location than the vehicle.

5. The method of claim 3, wherein the vehicle comprises an edge router that connects to the SD-WAN using a set of one or more wireless network connection links.

6. The method of claim 5, wherein the edge router is one of (i) an edge router appliance, (ii) an edge router that executes on a computer operating in the vehicle, or (iii) an edge router that executes on a machine that executes on the computer.

7. The method of claim 5, wherein updating the second VM comprises directing a hypervisor of the particular device to direct an update agent associated with the second VM to download, from the MP using one or more of the set of wireless network links, a set of one or more update files associated with a particular update for the first VM and update the second VM.

8. The method of claim 3, wherein:

the configuration state information comprises an operating system (OS) disk of the first VM that specifies one or more OS files and application software related to the first VM at the particular time the configuration state information was collected, collecting the configuration state information comprises directing a hypervisor of the particular device to collect the OS disk at the particular time, and using the configuration state information to instantiate the second VM comprises directing the hypervisor to use the OS disk to instantiate the second VM.

9. The method of claim 8, wherein using the updated second VM on the particular device instead of the first VM comprises directing the hypervisor to:

detach a set of one or more data disks comprising application data from the first VM; and attach the set of data disks to the updated second VM such that the set of data disks needed to use the updated second VM instead of the first VM are transferred to the updated second VM.

10. The method of claim 8, wherein using the updated second VM on the particular device instead of the first VM further comprises directing the hypervisor to:

archive the first VM to a data store of the hypervisor; and migrate the updated second VM from the isolated network environment to a production network environment that enables the updated second VM to perform the particular set of operations once the compute downtime of the vehicle ends.

11. The method of claim 1, wherein detecting the compute downtime comprises detecting a powering off of the vehicle.

12. The method of claim 11, wherein the updated second VM is used instead of the first VM within a particular time period after the compute downtime is detected.

13. The method of claim 12, wherein the compute downtime ends at a start of a next vehicle compute period.

14. The method of claim 13, wherein the start of the next vehicle compute period is a powering on of the vehicle.

15. A non-transitory machine readable medium storing a program for execution by at least one processing unit for efficiently updating software of virtual machines (VMs) executing on one or more devices in a vehicle such that updates to the software does not interrupt operations performed by the VMs, the program comprising sets of instructions for:

while the vehicle operates:

collecting configuration state information of a first VM executing a particular device, the first VM performing a particular set of operations;

using the configuration state information to instantiate a second VM in an isolated network environment that is isolated from the first VM, the second VM being identical to the first VM at a particular time the configuration state information was collected; and updating the second VM;

detecting a compute downtime of the vehicle; and during the compute downtime of the vehicle, using the updated second VM on the particular device instead of the first VM such that the updated second VM performs the particular set of operations once the compute downtime of the vehicle ends.

* * * * *